United States Patent
Liu et al.

(10) Patent No.: US 12,493,130 B2
(45) Date of Patent: Dec. 9, 2025

(54) METHOD FOR IMPROVING THE COINCIDENCE TIME RESOLUTION OF PET SYSTEM BASED ON STFT

(71) Applicant: ZHEJIANG UNIVERSITY, Hangzhou (CN)

(72) Inventors: Huafeng Liu, Hangzhou (CN); Amanjule Muhashi, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 224 days.

(21) Appl. No.: 18/386,680

(22) Filed: Nov. 3, 2023

(65) Prior Publication Data

US 2024/0159927 A1    May 16, 2024

(30) Foreign Application Priority Data

Nov. 3, 2022    (CN) .......................... 202211369736.7

(51) Int. Cl.
| | |
|---|---|
| *G01T 1/29* | (2006.01) |
| *A61B 6/58* | (2024.01) |
| *G01T 1/17* | (2006.01) |
| *G06N 3/0464* | (2023.01) |
| *G06N 3/08* | (2023.01) |

(52) U.S. Cl.
CPC ............ *G01T 1/2985* (2013.01); *A61B 6/582* (2013.01); *G01T 1/17* (2013.01); *G06N 3/0464* (2023.01); *G06N 3/08* (2013.01)

(58) Field of Classification Search
CPC ........ G06N 3/0464; G06N 3/08; G06N 3/045; G01T 1/2985; G01T 1/17; A61B 6/582
See application file for complete search history.

(56) References Cited

PUBLICATIONS

E. Berg et al., "Using Convolutional Neural Networks to Estimate Time-of-Flight From PET Detector Waveforms", Phys Med Biol. 63 (2). (Year: 2019).*

* cited by examiner

*Primary Examiner* — Casey Bryant
(74) *Attorney, Agent, or Firm* — Jiwen Chen; Joywin IP Law PLLC

(57) ABSTRACT

The method for improving the coincidence time resolution of PET system based on STFT, the method obtains waveform data by setting a point source at a specific location, and then obtains a short term frequency domain amplitude information through short time Fourier transform (STFT), after that, carrying out a train set, a validation set, and a test set partitioning, and a residual neural network model composed of residual modules and a fully connected layer is used for training, achieving estimation of the TOF time of the PET system. The present invention utilizes Monte Carlo simulation experiments to perform STFT transform on waveform data to obtain the short term frequency domain amplitude information, then, a residual neural network model is trained by using the divided train set, and the trained model is tested on the validation set to obtain the trained model, finally, the accuracy of TOF time estimation based on STFT model and the improvement effect on the coincidence time resolution of PET system compared to traditional CFD methods are verified through the test set.

9 Claims, 3 Drawing Sheets

METHOD FOR IMPROVING THE COINCIDENCE TIME RESOLUTION OF PET SYSTEM BASED ON STFT

This application claims priority of Chinese Application No. 2022113697367, filed Nov. 3, 2022, which is hereby incorporated by reference.

TECHNICAL FIELD

The present invention belongs to the field of PET imaging technology, and specifically relates to a method for improving the coincidence time resolution of PET system based on STFT.

DESCRIPTION OF RELATED ART

Positron Emission Tomography (PET) system is a nuclear medicine imaging technology that achieves diagnostic purposes by labeling essential substances in the metabolism of living organisms and injecting them into the organism for detection. These specific drugs labeled with radioactive nuclides are commonly referred to as tracers, and commonly used tracers comprise 18F, 11C, 15O, and so on. During the metabolism of organisms, nuclides have a probability of decay and releasing positrons, after a short period of drift, positrons will undergo annihilation reactions with surrounding negative electrons, producing a γ photon pair comprising two photons with opposite directions and equal energies; subsequently, the photon pair will be detected by a detection system composed of scintillation crystals and detectors and converted into electrical signals, inputting the electrical signals into the circuit, after certain signal processing, the concentration, location, and time information of radioactive substances in life activities can be obtained.

Furthermore, if the time difference between the two γ photons arrival at the detector can be determined, using the time difference information to obtain the exact location of the annihilation site, this PET detection system is called a Time of Flight (TOF) PET system, but the TOF-PET system has high requirements for time. In practical situations, the detection of γ photons has the following errors: ① conversion depth, after entering the crystal, γ photons will propagate for a certain distance before being absorbed; ② the process of crystal scintillation, in which the crystal emits light, there is a rise time and a decay time; ③ transmission time, the time for photons to exit the crystal and reach the photodetector is taken as the transmission time; ④ single photon dispersion time of photodetectors. This information is ultimately contained in the waveforms of the photodetectors.

At present, the main timing methods for waveforms of the photodetectors are the following two methods mentioned in the literature 《 Signal processing for picosecond resolution timing measurements》(Genat, J F et al., Jun. 11, 2009, published in Nuclear Instruments and Methods in Physics Research Section A: Accelerators, Spectrometers, Detectors and Associated Equipment, Journal 607 Vol. 2, pages 387-393):

Leading edge timing: this method first sets a certain voltage threshold $V_{th}$, the time $t_1$ and $t_2$ when a pair of waveforms first exceeds this threshold are taken as the arrival time of photons, the difference between the $t_1$ and $t_2$ two is used to obtain the TOF time.

Constant fraction timing: this method sets the threshold $V_{th}$ as the percentage of the maximum waveform value, and also setting the time $t_1$ and $t_2$ when a pair of waveforms first exceeds this threshold as the arrival time of photons, the difference between the $t_1$ and $t_2$ is used to obtain the TOF time.

In addition to the above mentioned constant fraction timing, there are also a zero crossing constant fraction timing and an interpolation constant fraction timing mentioned in the literature 《 Neural network-featured timing systems for radiation detectors: performance evaluation based on bound analysis》(Ai, P et al., published in September 2021 in the Journal of Instrumentation, Vol. 16, Issue 9, pp. 09-19).

Zero crossing constant fraction timing: this method copies each waveform into two sets, scaling the first set by multiplying it by a percentage, delaying the second set by multiplying it by a negative sign, and then adding the two sets of waveforms to obtain the final waveform, the zero crossing of the final waveform is considered as the photon arrival time, and finally, the zero crossing constant ratio timing is applied to each pair of waveforms to obtain $t_1$ and $t_2$, performing a difference between the two to obtain the TOF time.

Interpolation constant fraction timing: due to the fact that the waveform is a digital signal, it is not accurate to set the time when the waveform first exceeds the threshold as the photon arrival time in the ordinary constant fraction timing, the interpolation constant fraction timing linearly interpolates the sampling points on both sides of the threshold in the waveform, improving the equivalent sampling rate and obtaining more accurate photon arrival time $t_1$ and $t_2$, performing a difference between the two to obtain the TOF time.

However, these methods did not utilize the potential information contained in the waveforms; therefore, it is necessary to learn potential features in waveforms through some deep learning methods to further improve the coincidence time resolution of the PET system.

SUMMARY THE PRESENT INVENTION

In view of the above, the present invention provides a method for improving the coincidence time resolution of PET systems based on STFT, which can effectively improve the temporal resolution of PET system.

A method for improving the coincidence time resolution of PET system based on STFT, comprising the following steps:

(1) using a pair of PET detectors to detect the coincidence events that occur at the point source, and then saving the detected coincidence waveforms and corresponding point source positions;

(2) cropping the coincidence waveforms and calculating a true TOF value corresponding to each set of the coincidence waveforms;

(3) performing short time Fourier transform (STFT) on each set of the coincidence waveforms to obtain their short time frequency domain amplitude information;

(4) according to steps (1) to (3), obtaining a large number of samples, each group of samples comprises short term frequency domain amplitude information of the coincidence waveforms and the true TOF value, and then dividing all samples into a train set and a test set;

(5) constructing a residual convolutional neural network model consisting of multiple cascaded residual units and a fully connected layer;

(6) using the short term frequency domain amplitude information from the samples in the train set as a model input, and the TOF true value as a label, training the above network model;

(7) inputting the short term frequency domain amplitude information from the samples in the test set into the trained network model, the corresponding TOF time can be directly predicted and output.

Furthermore, the specific implementation of step (1) is as follows: placing a radioactive point source on the line of the pair of PET detectors, moving the point source on the line at certain step intervals, and using two detectors to detect coincidence events that occur at each position of the point source, multiple sets of coincidence waveforms are obtained, each set of coincidence waveforms contains two waveform sequences obtained by responding to paired gamma photons emitted by the two detectors for the same coincidence event, the delay of the two waveform sequences represents the PET time of flight.

Furthermore, the cropping process in step (2) takes the maximum values of each of the two waveform sequences of the coincidence waveforms, based on the maximum value point, forward sampling $t_1$ duration, backward sampling $t_2$ duration, consisting a waveform of $t_1+t_2$ length to ensure that most of the cropped waveforms have a rising edge; if the position of the point source corresponding to any group of waveforms is $\Delta x$, then the true TOF value of the coincidence waveform $$\Delta t = \frac{2 \times \Delta x}{c},$$

c is the speed of light.

Furthermore, in step (3), for the two waveform sequences $f_1(n)$ and $f_2(n)$ of the coincidence waveforms, using the following formula to perform short time Fourier transform on the $f_1(n)$ and $f_2(n)$:

$$F_1(n, \omega) = \sum_{m=-\infty}^{\infty} f_1(m)h(m-n)e^{-j\omega m}$$

$$F_2(n, \omega) = \sum_{m=-\infty}^{\infty} f_2(m)h(m-n)e^{-j\omega m}$$

wherein, $F_1(n, \omega)$ and $F_2(n, \omega)$ respectively represent the result after short time Fourier transform of the $f_1(n)$ and $f_2(n)$, both of which are two-dimensional arrays, the horizontal axis n represents the time, and the vertical axis $\omega$ represents frequency, h( ) is the window function, j is the imaginary unit, and m represents the time shift during Fourier transform.

Then extracting the amplitudes $S_1(n, \omega)$ and $S_2(n, \omega)$ of the $f_1(n)$ and $f_2(n)$ respectively, and then the $S_1(n, \omega)$ and $S_2(n, \omega)$ are spliced up and down to be used as the short term frequency domain amplitude information of the coincidence waveform.

Furthermore, the residual units are composed of three residual modules D1 to D3 connected in sequence, each residual module is composed of a convolutional layer, a batch normalization layer, and an activation function ReLU connected in sequence from input to output, the convolutional kernel size of the convolutional layers in D1 and D3 is 1×1. the convolutional kernel size of the convolutional layer in D2 is 3×3, the output of D3 is added to the input of D1, and then processed by the activation function ReLU as the output of the residual unit.

Furthermore, the output of each residual unit in the network model serves as the input of the next residual unit, the input of the first residual unit is the short term frequency domain amplitude information in the samples in the train set, which is expanded into a one-dimensional vector after passing through multiple residual units. after passing through the fully connected layer, the one-dimensional vector is output as the TOF time corresponding to the coincidence waveform.

Furthermore, the process of training the network model in step (6) is as follows:

6.1. initializing model parameters, comprising a bias vector, a weight matrix, a learning rate, and an optimizer of each layer, 6.2. inputting the short term frequency domain amplitude information in the samples in the train set into the model, and the model propagates forward to obtain the corresponding prediction result, namely TOF time, calculating a loss function L between the prediction result and the label;

6.3. based on the loss function L, the optimizer iteratively updates the model parameters by using the gradient descent method until the loss function L converges, and the training is completed.

Furthermore, the loss function L adopts mean square error.

Furthermore, the optimizer adopts an Adam optimizer.

The present invention uses a residual neural network model based on STFT to estimate the TOF of the PET system, extracting potential frequency domain features in waveforms, and providing assistance for better timing. The present invention enables the PET system to achieve a better coincidence time resolution, thereby utilizing TOF information to obtain better spatial resolution, and enabling the PET system to provide more accurate information in medical imaging, providing better assistance for clinical diagnosis.

DETAILED DESCRIPTION OF THE INVENTION

Figure 1:
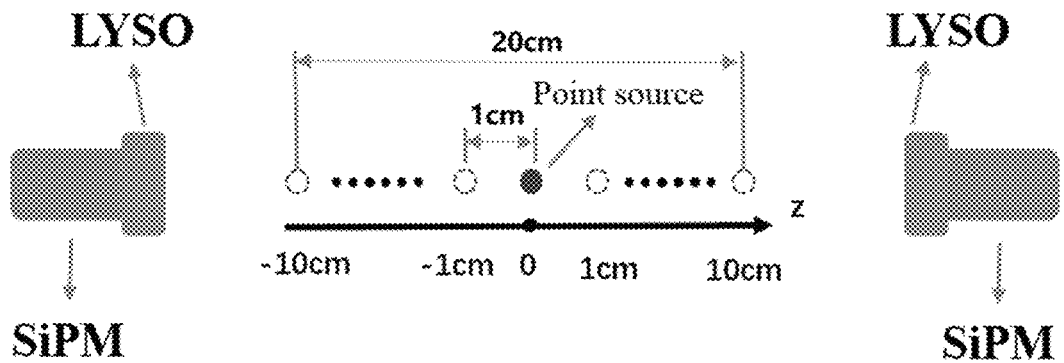
FIG. 1 is a schematic diagram of PET system coincidence event waveform and TOF true value data detection.

In order to provide a more specific description of the present invention, the following will provide a detailed explanation of the technical solution of the present invention in conjunction with the accompanying drawings and specific implementation methods.

A method for improving the coincidence time resolution of PET system based on STFT of the present invention, comprising the following steps:

(1) placing a radioactive point source on the line of the pair of PET detectors, moving the point source on the line at certain step intervals, and collecting the waveforms of the two detectors that meet the coincidence events, and saving the point source positions Δx and waveforms of each group of the coincidence events.

The position of the point source is on the line between two detectors, after collecting enough coincidence events each time, it moves along the line of the two detectors in a certain step length and continues to collect the waveform data of the next batch of coincidence events.

(2) for each coincidence event, cropping and collecting each pair of waveforms, taking the time $t_0$ when the waveform reaches its highest value as the reference point, and taking waveforms of the time $t_1$ and $t_2$ for forward and backward respectively, consisting a waveform data of $t_1+t_2$ length. Based on the saved point source location Δx, calculating the true value Δt of TOF by using the following formula:

$$\Delta t = \frac{2 \times \Delta x}{c}$$

wherein, c is the speed of light.

(3) performing short time Fourier transform (STFT) on $f_1(n)$ and $f_2(n)$ in each pair coincidence waveforms, expressed as:

$$F(n, \omega) = \sum_{m=-\infty}^{\infty} f(m)h(n-m)e^{-j\omega m}$$

wherein, f(n) are the coincidence waveforms, h(n) is the window function(choice of Hanning windows, etc), F(n, ω) are the two-dimensional arrays, horizontal axis represents the time n, and the vertical axis represents frequency ω.

Then extracting the short term frequency domain amplitude information of the waveforms in the amplitudes S(n, ω) of F(n, ω), expressed as:

S(n, ω)=|F(n, ω)| the short term frequency domain amplitude information $S_1(n, \omega)$ and $S_2(n, \omega)$ are obtained by performing short time Fourier transform on $f_1(n)$ and $f_2(n)$, and then the $S_1(n, \omega)$ and $S_2(n, \omega)$ are spliced up and down to be used as the short term frequency domain amplitude information of the coincidence waveform.

(4) randomly allocating the collected short term frequency domain amplitude information of the coincidence waveforms with the true TOF values into a train set, a validation set, and a test set; the requirement for dividing the dataset is that it does not duplicate each other, and the train set, validation set, and test set are divided in a 7:2:1 ratio.

(5) extracting the coincidence event data from the train set, using the waveform short term frequency domain amplitude information S as the input sample, and using the TOF true value Δt as the truth label, training the residual convolutional neural network, and finally obtaining the TOF time estimation model of the PET system based on STFT based on the performance of the model on the validation set, specifically:

5.1 constructing a residual neural network model, which consists of multi-layer residual units and a fully connected layer, each residual unit is connected by multiple residual modules, and each residual module is connected by convolutional layers, activation functions, and batch normalization layers.

5.2 initializing the parameters of the above network model, including the bias vector and weight matrix of each residual module and fully connected layer;

5.3 Training the residual neural network model under the guidance of the TOF truth label in the train set, and verifying the training status of the model through the validation set. Specifically, inputting the waveform short term frequency domain amplitude information of each coincidence event in the train set into the residual neural network model, obtaining the prediction result Δt' of the residual neural network model, and calculating the mean square error L between the output result and the truth label Δt, and optimizing the parameters of each residual module through the Adam optimizer. After each training step, using the waveform short-term frequency domain amplitude information of each coincidence event in the validation set as input to obtain the predicted valueΔt" of the residual neural network model, and calculating its mean square error L' with the truth label; when the error of the model on the validation set no longer decreases, the final residual neural network model is obtained.

The expression of the error function L is:

$$L = \|\Delta t' - \Delta t\|_2^2$$

The expression of the error function L' is:

$$L' = \|\Delta t'' - \Delta t\|_2^2$$

wherein, $$\| \|_2^2$$

is the square of the L2 norm.

(5) extracting the coincidence event data from the test set, inputting the waveform short term frequency domain amplitude information as input samples into the trained network model, and output the estimated TOF time value of the network model.

In the following implementation embodiment, we used Monte Carlo simulation to obtain waveform data, and the detection and acquisition of coincidence event data are shown in FIG. 1. In the simulation, the PET detector consists of a LYSO crystal and a SiPM photodetector group, the center of the line connecting a pair of PET detectors is taken as the origin, and the line is on the z-axis, point sources are placed every 1 cm and 3000 sets of coincidence event data are collected, a total of 63000 sets of coincidence event data are collected from the 21 positions.

Cropping and collecting each pair of waveforms, taking the time to when the waveform reaches its highest value as the reference point, and taking waveforms with a duration of 3.5 ns and 1.5 ns forward and backward respectively to form a pair of waveform data $f_1(n)$ and $f_2(n)$ with a length of 5 ns. Due to the waveform sampling interval is 0.05 ns, this pair of waveform data is all one-dimensional data with a length of 100.

Then, performing short time Fourier transform (STFT) on $f_1(n)$ and $f_2(n)$ in the pair data waveforms, expressed as:

$$F(n, \omega) = \sum_{m=-\infty}^{\infty} f(m)h(m-n)e^{-j\omega m}$$

wherein, f(n) are corresponding discrete waveform data, h(n) is the window function(, F(n, ω) are the two-dimensional arrays, horizontal axis represents the time n, and the vertical axis represents frequency ω.

Then extracting the short term frequency domain amplitude information of the waveforms in the amplitudes S(n, ω) of F(n, ω), expressed as:

$$S(n, \omega) = |F(n, \omega)|$$

the short term frequency domain amplitude information $S_1(n, \omega)$ and $S_2(n, \omega)$ are obtained by performing short time Fourier transform on $f_1(n)$ and $f_2(n)$, and then the $S_1(n, \omega)$ and $S_2(n, \omega)$ are spliced up and down to be used as the short term frequency domain amplitude information of the coincidence waveform.

Finally, based on the point source location Δx, calculating the true value Δt of TOF by using the following formula:

$$\Delta t = \frac{2 \times \Delta x}{c}$$

wherein, c is the speed of light.

At this point, a coincidence event data consists of a two-dimensional array S representing the short term frequency domain amplitude information of the waveform and a true TOF value Δt.

Dividing the collected 63000 sets of coincidence event data into the train set, the validation set, and the test set in a 7:2:1 ratio.

Figure 3:
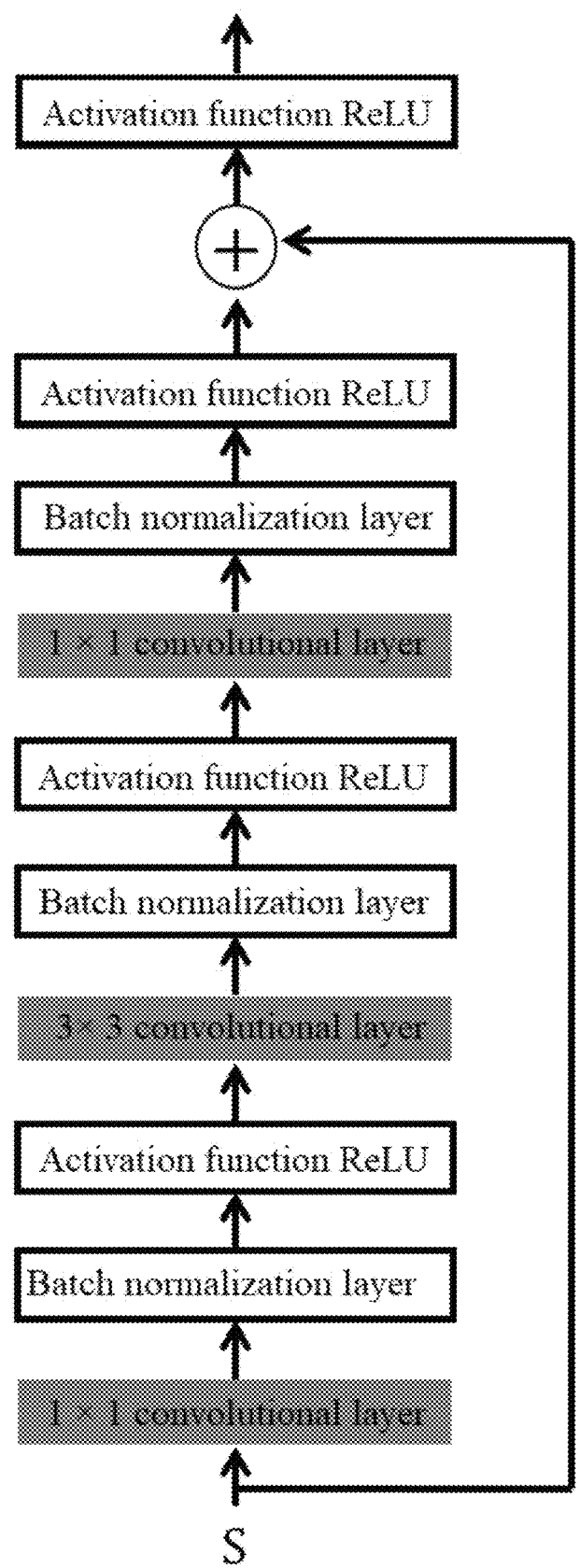
FIG. 3 is a schematic diagram of the structure of the residual unit in the network model of the present invention.

Building the residual modules: each residual module is composed of a convolutional layer, a batch normalization layer, and an activation function ReLU, as shown in FIG. 3, each residual module is composed of three small modules, each small module is composed of a convolutional layer, a batch normalization layer, and an activation function ReLU, the convolutional kernel size of the first module and the third module is 1×1, the convolutional kernel size of the second module is 1×1. The short term frequency domain amplitude signal S is added to itself after passing through three small modules, and finally serving as the output of the entire residual module through the activation function ReLU layer.

Figure 2:
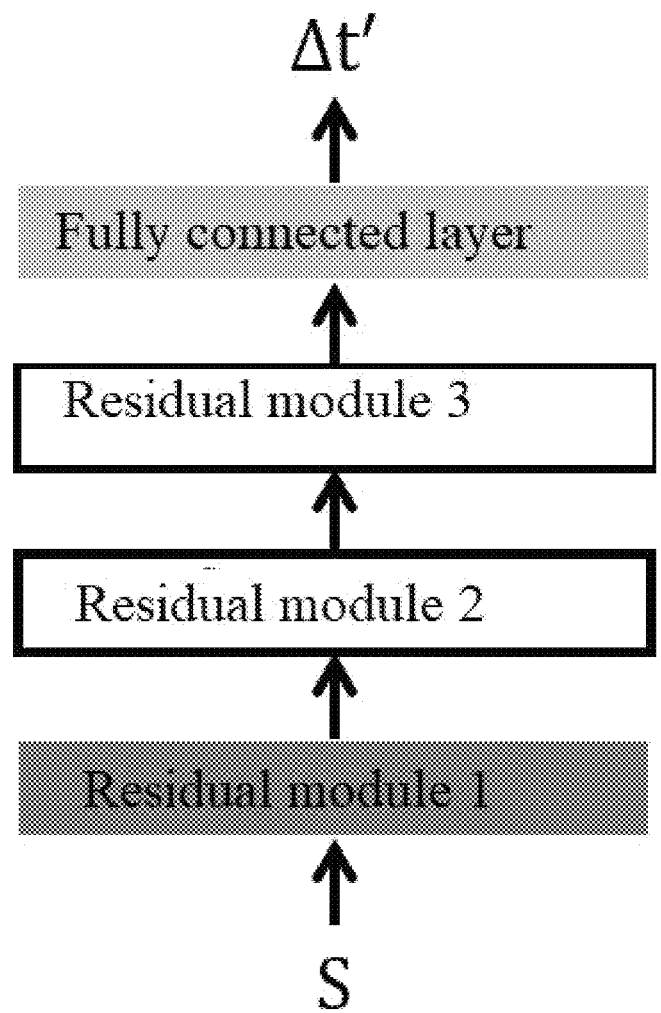
FIG. 2 is a schematic diagram of the overall structure of the network model of the present invention.

Constructing a residual neural network model: the model consists of three residual modules and a fully connected layer, as shown in FIG. 2, the structures of residual modules 1, 2, and 3 are all shown in FIG. 3; after passing through three residual modules, the short term frequency domain amplitude signal S is expanded into a one-dimensional vector, which is then passed through a linear layer to obtain the final TOF time prediction value ΔΔt'.

Training the residual neural network model under the guidance of the TOF truth label in the train set, and verifying the training status of the model through the validation set. Specifically, inputting the waveform short term frequency domain amplitude information of each coincidence event in the train set into the residual neural network model, obtaining the prediction result Δt' of the residual neural network model, and calculating the mean square error L between the output result and the truth label Δt, and optimizing the parameters of each residual module through the Adam optimizer. After each training step, using the waveform short-term frequency domain amplitude information of each coincidence event in the validation set as input to obtain the predicted valueΔt" of the residual neural network model, and calculating its mean square error L' with the truth label; when the error of the model on the validation set no longer decreases, the final residual neural network model is obtained. The expression of the error function L and L' is:

$$L = \|\Delta t' - \Delta t\|_2^2$$

$$L' = \|\Delta t'' - \Delta t\|_2^2$$

wherein, $$\| \ \|_2^2$$

is the square of the L2 norm.

Figure 4:
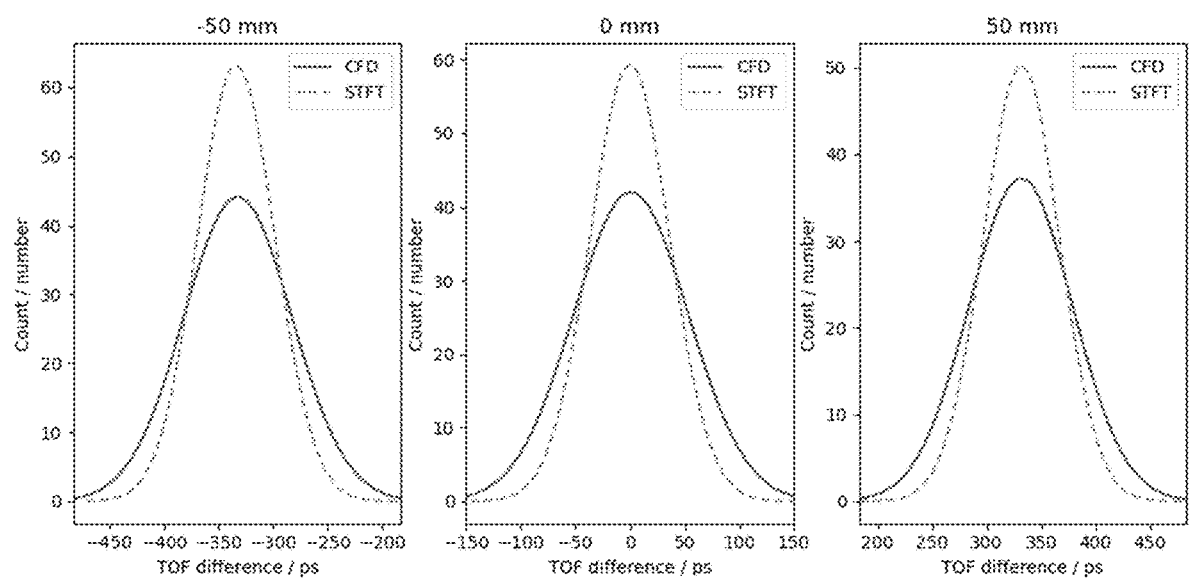
FIG. 4 is a schematic diagram of the comparison of TOF prediction results between the present invention and traditional methods at point source positions of −50 mm, 0 mm, and 50 mm.

Finally, extracting the coincidence event data from the test set, inputting them into the trained residual neural network model, and outputting the predicted TOF time value of the model; The time difference distribution spectrum of TOF time values at various positions is statistically predicted, and the time difference distribution spectra at −50 mm, 0 mm, and 50 mm are shown in FIG. 4, the comparison method is the constant fraction timing (CFD), and it can be clearly seen that the time difference distribution spectrum predicted by the model of the present invention is significantly more concentrated, and its full width at half maxima (FWHM) is lower.

The full width at half maxima of the time difference distribution between the STFT based model and the traditional CFD method in the range of −100 mm to 100 mm are shown in Table 1:

TABLE 1

| Location/ mm | CFD method FWHM/ps | STFT method FWHM/ps | Relative improvement |
| --- | --- | --- | --- |
| −100 | 99.82 | 60.73 | 39.16% |
| −90 | 105.38 | 75.79 | 28.09% |
| −80 | 108.66 | 77.65 | 28.54% |
| −70 | 103.86 | 84.49 | 18.64% |
| −60 | 108.70 | 82.88 | 23.75% |
| −50 | 106.90 | 83.56 | 21.83% |
| −40 | 108.85 | 82.16 | 24.52% |
| −30 | 112.60 | 84.97 | 24.54% |
| −20 | 114.47 | 77.05 | 32.69% |
| −10 | 113.69 | 85.88 | 24.46% |
| 0 | 117.59 | 85.56 | 27.24% |
| 10 | 111.01 | 78.15 | 29.60% |
| 20 | 123.31 | 84.48 | 31.49% |
| 30 | 104.15 | 76.16 | 26.87% |
| 40 | 114.79 | 85.46 | 25.55% |
| 50 | 105.94 | 82.25 | 22.36% |
| 60 | 107.43 | 79.37 | 26.12% |
| 70 | 110.32 | 80.60 | 26.94% |
| 80 | 111.26 | 79.09 | 28.91% |
| 90 | 114.50 | 72.49 | 36.68% |
| 100 | 107.30 | 53.46 | 50.18% |

From the above experimental results, we can see that the TOF time estimation method of the PET system based on STFT in the present invention effectively improves the full width at half maxima of the PET system at various positions, and improves the temporal resolution of the PET system.

The above description of the embodiments is for the convenience of ordinary technical personnel in the art to understand and apply the present invention. Those familiar with the art can clearly make various modifications to the above embodiments and apply the general principles explained here to other embodiments without the need for creative labor. Therefore, the present invention is not limited to the aforementioned embodiments. According to the disclosure of the present invention, the improvements and modifications made by those skilled in the art should be within the scope of protection of the present invention.

The invention claimed is:

1. A method for improving a coincidence time resolution of a PET system based on Short-Time Fourier Transform (STFT), comprising the following steps:
   (1) using a pair of PET detectors to detect coincidence events that occur at a point source, and then saving aplurality of sets of coincidence waveforms and a plurality of corresponding point source positions;
   (2) cropping each of the plurality of sets of coincidence waveforms and calculating a true TOF value corresponding to each set of the coincidence waveforms;
   (3) performing STFT on each set of the coincidence waveforms to obtain their short-time frequency domain amplitude information;
   (4) according to steps (1) to (3), obtaining a large number of samples, each group of samples comprises short-time frequency domain amplitude information of the plurality of sets of coincidence waveforms and the true TOF value, and then dividing all samples into a train set and a test set;
   (5) constructing a residual convolutional neural network model consisting of multiple cascaded residual units and a fully connected layer;
   (6) using the short-time frequency domain amplitude information from the samples in the train set as a model input, and the TOF true value as a label, training the above network model;
   (7) inputting the short-time frequency domain amplitude information from the samples in the test set into the trained network model, the corresponding TOF time can be directly predicted and output.

2. The method for improving the coincidence time resolution of PET system based on STFT according to claim 1, wherein, the specific implementation of step (1) is as follows: placing a radioactive point source on the line of the pair of PET detectors, moving the point source on the line at certain step intervals, and using two detectors to detect coincidence events that occur at each position of the point source, multiple sets of coincidence waveforms are obtained, each set of coincidence waveforms contains two waveform sequences obtained by responding to paired gamma photons emitted by the two detectors for the same coincidence event, the delay of the two waveform sequences represents the PET time of flight.

3. The method for improving the coincidence time resolution of PET system based on STFT according to claim 1, wherein, the cropping process in step (2) takes the maximum values of each of the two waveform sequences of the coincidence waveforms, based on the maximum value point, forward sampling $t_1$ duration, backward sampling $t_2$ duration, consisting a waveform of $t_1+t_2$ length to ensure that most of the cropped waveforms have a rising edge; if the position of the point source corresponding to any group of waveforms is $\Delta x$, then the true TOF value of the coincidence waveform $$\Delta t = \frac{2 \times \Delta x}{c},$$

c is the speed of light.

4. The method for improving the coincidence time resolution of PET system based on STFT according to claim 3, wherein, in step (3), for the two waveform sequences $f_1(n)$ and $f_2(n)$ of the coincidence waveforms, using the following formula to perform short time Fourier transform on the $f_1(n)$ and $f_2(n)$:

$$F_1(n, \omega) = \sum_{m=-\infty}^{\infty} f_1(m)h(m-n)e^{-j\omega m}$$

$$F_2(n, \omega) = \sum_{m=-\infty}^{\infty} f_2(m)h(m-n)e^{-j\omega m}$$

wherein, $F_1(n, \omega)$ and $F_2(n, \omega)$ respectively represent the result after short time Fourier transform of the $f_1(n)$ and $f_2(n)$, both of which are two-dimensional arrays, the horizontal axis n represents the time, and the vertical axis $\omega$ represents frequency, h( ) is the window function, j is the imaginary unit, and m represents the time shift during Fourier transform;
then extracting the amplitudes $S_1(n, \omega)$ and $S_2(n, \omega)$ of the $f_1(n)$ and $f_2(n)$ respectively, and then the $S_1(n, \omega)$ and $S_2(n, \omega)$ are spliced up and down to be used as the short term frequency domain amplitude information of the coincidence waveform.

5. The method for improving the coincidence time resolution of PET system based on STFT according to claim 1, wherein, the residual units are composed of three residual modules D1 to D3 connected in sequence, each residual module is composed of a convolutional layer, a batch normalization layer, and an activation function ReLU connected in sequence from input to output, the convolutional kernel size of the convolutional layers in D1 and D3 is 1×1, the convolutional kernel size of the convolutional layer in D2 is 3×3, the output of D3 is added to the input of D1, and then processed by the activation function ReLU as the output of the residual unit.

6. The method for improving the coincidence time resolution of PET system based on STFT according to claim 1, wherein, the output of each residual unit in the network model serves as the input of the next residual unit, the input of the first residual unit is the short-term frequency domain amplitude information in the samples in the train set, which is expanded into a one-dimensional vector after passing through multiple residual units, after passing through the fully connected layer, the one-dimensional vector is output as the TOF time corresponding to the coincidence waveform.

7. The method for improving the coincidence time resolution of PET system based on STFT according to claim 1, wherein, the process of training the network model in step (6) is as follows:
   a) initializing model parameters, comprising a bias vector, a weight matrix, a learning rate, and an optimizer of each layer,
   b) inputting the short-term frequency domain amplitude information in the samples in the train set into the model, and the model propagates forward to obtain the corresponding prediction result, namely TOF time, calculating a loss function L between the prediction result and the label; and c) based on the loss function L, the optimizer iteratively updates the model parameters by using the gradient descent method until the loss function L converges, and the training is completed.

8. The method for improving the coincidence time resolution of PET system based on STFT according to claim 7, wherein, the loss function L adopts mean square error.

9. The method for improving the coincidence time resolution of PET system based on STFT according to claim 7, wherein, the optimizer adopts an Adam optimizer.

* * * * *